United States Patent [19]

Miyaguchi et al.

[11] 4,252,701

[45] Feb. 24, 1981

[54] MODIFIED CYCLOPENTADIENE RESINS, PROCESS FOR PREPARING THE SAME, AND A COMPOSITION FOR PRINTING INK CONTAINING SAID MODIFIED RESINS AS VEHICLE COMPONENTS

[75] Inventors: Akinori Miyaguchi; Yasuyoshi Chino, both of Yokohama, Japan

[73] Assignees: Nippon Zeon Co. Ltd.; Morimura-Chemetron Ltd., both of Tokyo, Japan

[21] Appl. No.: 80,145

[22] Filed: Sep. 28, 1979

[30] Foreign Application Priority Data

Oct. 6, 1978 [JP] Japan ................................ 53-123228

[51] Int. Cl.³ ..................... C09D 3/727; C09D 3/733; C09D 11/10
[52] U.S. Cl. ............................... 260/23.7 C; 106/27; 106/28; 260/DIG. 38; 525/221
[58] Field of Search ................. 260/23.7 C, DIG. 38; 106/27, 28; 525/221

[56] References Cited

U.S. PATENT DOCUMENTS

| | | | |
|---|---|---|---|
| 3,084,147 | 4/1963 | Wilks | 526/283 |
| 3,428,589 | 2/1969 | Coats | 260/23.7 C |
| 3,448,066 | 6/1969 | Parker | 260/23.7 C |
| 3,520,840 | 7/1970 | Que | 260/23.7 C |
| 3,984,381 | 10/1976 | Tsuchiya et al. | 526/283 |
| 4,028,291 | 6/1977 | Tsuchiya et al. | 260/23.7 C |
| 4,056,498 | 11/1977 | Laurito | 260/23.7 C |

FOREIGN PATENT DOCUMENTS 997626  7/1965  United Kingdom ............... 260/23.7 C

*Primary Examiner*—Ronald W. Griffin
*Attorney, Agent, or Firm*—Sherman & Shalloway

[57] ABSTRACT

A process for producing a novel modified resin, which comprises reacting (I) the reaction product of (a) an adduct of a cyclopentadiene resin with an $\alpha,\beta$-unsaturated dicarboxylic acid anhydride, with (b) an adduct of a higher fatty acid ester having a conjugated double bond with an $\alpha,\beta$-unsaturated dicarboxylic acid anhydride, with (II) a polyamine having at least two primary or secondary amino groups; and a vehicle component composition for printing inks comprising the aforesaid modified resin.

15 Claims, No Drawings

MODIFIED CYCLOPENTADIENE RESINS, PROCESS FOR PREPARING THE SAME, AND A COMPOSITION FOR PRINTING INK CONTAINING SAID MODIFIED RESINS AS VEHICLE COMPONENTS

This invention relates to a novel modified resin suitable as a vehicle component of a printing ink, a process for producing the modified resin, and a printing ink composition containing this modified resin as a vehicle component. More specifically, this invention relates to a novel modified resin derived from a cyclopentadiene resin, a higher fatty acid ester, an $\alpha,\beta$-unsaturated dicarboxylic acid anhydride and a polyamine, a process for producing said modified resin, and a printing ink composition containing this modified resin as a vehicle component.

Various methods have been known in the past for the modification of cyclopentadiene resins. They include, for example, a method which comprises cooking a cyclopentadiene resin and a natural drying oil (U.S. Pat. No. 3,084,147), and a method which comprises reacting a cyclopentadiene resin with a higher unsaturated fatty acid in the presence of a metal compound (Japanese Patent Publication No. 2633/75). However, modified resins obtained by these methods have not proved to be entirely satisfactory in regard to the properties required of a vehicle of printing ink, such as wettability with pigments, solubility in ink solvents and viscosity characteristics.

We made extensive investigations in order to develop a resin useful as a vehicle component of ink and free from the aforesaid defects of the prior art. As a result, we found that a high-molecular-weight modified resin suitable as an ink vehicle component can be obtained by reacting (a) an adduct of a cyclopentadiene resin with an $\alpha,\beta$-unsaturated dicarboxylic acid anhydride with (b) an adduct of a higher fatty acid ester having a conjugated double bond with an $\alpha,\beta$-unsaturated dicarboxylic acid anhydride at an elevated temperature in an atmosphere of an inert gas in the optional presence of a metal compound (Japanese Laid-Open Patent Publication No. 125494/78 corresponding to U.S. Pat. No. 4,183,833). The resulting modified resin exhibits far better performances than conventional cyclopentadiene resin in regard to wettability with pigments, solubility in ink solvents, and compatibility with other ink vehicle components. However, inks containing this modified resin as a vehicle are not entirely satisfactory in regard to the properties of a coated film such as strength, adhesion and gloss, and it has been desired to develop a resin capable of remedying these defects.

It is an object of this invention therefore to provide a novel high-molecular-weight modified resin derived from a cyclopentadiene resin and a higher unsaturated fatty acid ester as main starting materials, a process for producing the modified resin and a printing ink composition containing this modified resin as a vehicle component.

Another object of this invention is to provide a novel modified resin which has superior wettability with pigments, good solubility in ink solvents, and good compatibility with other ink vehicle components, and is suitable for preparing an ink having excellent film properties, a process for producing the modified resin and a printing ink composition containing this modified resin as a vehicle component.

The objects of this invention are achieved by a process for producing a modified resin, which comprises reacting (I) the reaction product of (a) an adduct of a cyclopentadiene resin with an $\alpha,\beta$-unsaturated dicarboxylic acid anhydride with (b) an adduct of a higher fatty acid ester having a conjugated double bond with an $\alpha,\beta$-unsaturated dicarboxylic acid anhydride, with (II) a polyamine containing at least two primary or secondary amino groups.

The cyclopentadiene resin used in this invention is obtained in a customary manner by heat-polymerizing a cyclopentadiene monomer such as cyclopentadiene, methylcyclopentadiene or dimers, trimers or codimers thereof, or a mixture of the cyclopentadiene monomer with a minor amount of a comonomer copolymerizable therewith. Cyclopentadiene resins having a softening point of 80° to 200° C., especially 100° to 170° C., and a Gardner color number of not more than 13 are suitable.

Specific examples of the comonomer include monolefins such as ethylene, propylene, butene or styrene; conjugated dienes such as 1,3-butadiene, isoprene or 1,3-pentadiene; and polar vinyl monomers such as vinyl acetate, acrylic esters, methacrylic esters, acrylonitrile and allyl alcohol. Homopolymers of cyclopentadiene monomers, and copolymers of cyclopentadiene monomers with hydrocarbon-type comonomers such as monolefins and conjugated dienes are preferred.

In the present invention, a higher fatty acid ester having a conjugated double bond is used together with the cyclopentadiene resin. Examples of the higher fatty acid ester are esters formed between monocarboxylic acids containing at least 12 carbon atoms and having a conjugated double bond in the molecular chain, such as eleostearic acid or parinaric acid, and monohydric or polyhydric alcohols such as methanol, ethanol, butanol, octanol, ethylene glycol, glycerol, pentaerythritol or trimethylol propane. Of these, triesters of glycerol are preferred. The triglycerides are contained in natural drying oils such as tung oil, dehydrated castor oil, oiticica oil and perilla oil. In the present invention, these natural oils are suitable as a source of the higher fatty acid esters.

In the present invention, an $\alpha,\beta$-unsaturated dicarboxylic acid anhydride is used as still another component. Specific examples are maleic anhydride, citraconic anhydride, itaconic anhydride, and alkyl substitution products thereof. Maleic anhydride is preferred in view of its reactivity, quality and economy. When $\alpha,\beta$-unsaturated dicarboxylic acids such as maleic acid, itaconic acid and citraconic acid are used, modified resins suitable as an ink vehicle component cannot be obtained.

In the present invention, these components should not be reacted at random. It is necessary first to form (a) an adduct between the cyclopentadiene resin and the $\alpha,\beta$-unsaturated dicarboxylic acid anhydride, and (b) an adduct between the higher fatty acid ester and the $\alpha,\beta$-unsaturated dicarboxylic acid anhydride, and then to react the adduct (a) with the adduct (b). If this sequence is changed and an attempt is made to react the cyclopentadiene resin first with the higher fatty acid ester, reaction scarcely occurs between them, and only the higher fatty acid ester is selectively gelled, making it impossible to obtain a high-molecular-weight reaction product. However, this sequence does not necessarily determine the sequence of adding the three components. For example, it is possible to mix the cyclopentadiene resin with the higher fatty acid ester under conditions which do not gel the ester, add the α,β-unsaturated dicarboxylic acid anhydride to the mixture to induce an addition reaction between it and each of the two components of the mixture, and then react the entire mixture at an elevated temperature or in the presence of a catalyst.

The ratio between the adduct (a) and the adduct (b) used in the reaction can be varied over a wide range according to the properties required of the desired modified resin. Usually, 98 to 35% by weight of the adduct (a) and 2 to 65% by weight of the adduct (b) are used. To obtain especially suitable properties as an ink vehicle component, it is preferred to use the adduct (a) in a proportion of 95 to 40% by weight, especially 90 to 50% by weight, and the adduct (b) in a proportion of 5 to 60% by weight, especially 10 to 50% by weight.

The amount of the α,β-unsaturated dicarboxylic acid anhydride is preferably at least 0.1 part by weight, usually 0.2 to 50 parts by weight, per 100 parts by weight of each of the cyclopentadiene resin and the higher fatty acid ester in order to increase the reactivity of the cyclopentadiene resin with the higher fatty acid ester.

To obtain a modified resin useful as an ink vehicle component, it is suitable to use the unsaturated dicarboxylic acid anhydride in an amount of 0.3 to 15 parts by weight, preferably 0.5 to 10 parts by weight, per 100 parts by weight of the cyclopentadiene resin, or the higher fatty acid ester.

Synthesis of the adduct (a) and (b) can be easily carried out in a customary manner, for example at 150° to 250° C. for about 10 minutes to 5 hours. In the present invention the separately prepared adducts (a) and (b) are mixed, or the adducts (a) and (b) are formed in situ by simultaneously reacting the cyclopentadiene resin, higher fatty acid ester and α,β-unsaturated dicarboxylic acid anhydride. Then, the adducts (a) and (b) are heated in an atmosphere of an inert gas such as nitrogen or argon to form the reaction product between these adducts. Usually, this reaction is carried out at 190° to 300° C. for 30 minutes to 8 hours. When the reaction temperature is below 190° C., the reaction tends to proceed slowly, and when the reaction temperature exceeds 300° C., there is a tendency toward the coloration or decomposition of the resin.

The reaction is performed usually in the absence of a diluent. If desired, a diluent may be used. Examples of the diluent are ordinary hydrocarbon solvents such as benzene, toluene, xylene, tetralin and mineral oils, and natural oils inert to the reaction, such as linseed oil and soybean oil.

If desired, a metal compound may be used as a catalyst in the reaction of the adducts (a) and (b). Specific examples of the metal compound are compounds of metals of groups IV, VII and VIII, such as titanium, zirconium, tin, lead, manganese, iron, cobalt, nickel, ruthenium, rhodium and palladium. Of these compounds, those which are soluble in the cyclopentadiene resin and higher fatty acid ester, especially organic acid salts and organic chelate compounds, are preferred. The amount of the metal compound is not particularly limited. But to increase the rate of reaction, the metal compound is used desirably in an amount of 0.1 to 10 parts by weight, preferably 0.2 to 8 parts by weight, per 100 parts by weight of the sum of the adducts (a) and (b).

According to this invention, the reaction product (I) so obtained is reacted with (II) a polyamine containing at least 2 primary or secondary amino groups to form the desired modified resin. Since this reaction is imidization or amination which takes place between the acid anhydride group of the reaction product (I) and the primary or secondary amino groups in the polyamine (II), tertiary amines not containing these amino groups cannot be used. Furthermore, use of monoamines instead of polyamines cannot give modified resins having improved film properties which are desired in the present invention.

Specific polyamines used in this invention are alkylene diamines and substitution products thereof such as ethylenediamine, propylenediamine, butylenediamine, hexylenediamine, octylenediamine, methylaminopropylamine, ethylaminoethylamine, ethylaminobutylamine, propylaminopropylamine, octylaminopropylamine, dodecylaminopropylamine, hexadecylaminopropylamine and aminoethylethanolamine; aromatic diamines and substitution products thereof such as phenylenediamine and xylylenediamine; and polyalkylene polyamines and substitution products thereof, such as diethylenetriamine, triethylenetetramine, tetraethylenepentamine, di(methylethylene)triamine, hexapropyleneheptamine, tri(ethylethylene)tetramine, penta(1-methylpropylene)hexamine, and tetrabutylenepentamine. Of these, polyamines having not more than 20 carbon atoms are suitable. These polyamines may be used in a combination of two or more, and it is also possible to use primary or secondary monoamines together with the polyamine in amounts which do not substantially hamper the effects of this invention.

The reaction between the reaction product (I) and the polyamine (II) is carried out in a customary manner. For example, it is carried out in an atmosphere of an inert gas such as nitrogen or argon at a temperature of 50° to 200° C. for a period of 10 minutes to 5 hours. The amount of the polyamine is selected as desired, but usually is 0.1 to 5 moles, preferably 0.2 to 2 moles, per mole of the acid anhydride group contained in the reaction product. If this amount is less than 0.1 mole, the improving effect of this invention tends to be reduced. When the amount exceeds 5 moles, the cost of production increases, and moreover, when the product is used as an ink vehicle, its balance with a dampening solution tends to be destroyed.

By reacting the reaction product between the cyclopentadiene resin and the higher fatty acid ester in the aforesaid manner with the polyamine, a novel high-molecular-weight modified resin is obtained. This modified resin usually has a softening point of 40° to 180° C., and possesses superior wettability with pigments, superior solubility in ink solvents, and superior compatibility with natural drying oils, rosin-modified phenol resins, alkyd resins, phenolic resins, maleic acid resins, xylene resins, ketone resins, petroleum resins, etc. Inks obtained by using this resin as a vehicle exhibit better performances in regard to the strength, adhesion and gloss of coated films prepared therefrom than inks containing unmodified resins as vehicles.

These modified resins are used in applications in which cyclopentadiene resins generally find, such as paints, adhesives and varnishes. It is also suitable as an ink vehicle component, and is especially useful as a vehicle component of offset printing inks.

The following examples illustrate the present invention more specifically. All parts and percentages in these examples are by weight unless otherwise specified.

EXAMPLE 1

One hundred parts of a cyclopentadiene resin having a softening point of 135° C. and a Gardner color number of 4 and being obtained by heat-polymerizing cyclopentadiene having a purity of 97% in the presence of xylene at 260° C. for 4 hours, and 50 parts of tung oil were heated at 170° C. to melt the resin, and then reacted with 4 parts of maleic anhydride at 180° C. for 1 hour. Furthermore, 1 part of zirconium octenate was added. The temperature was raised to 240° C. to, and the reaction was performed for 5 hours. Then, each of the amines shown in Table 1 was added in an equimolar amount to the maleic anhydride added previously, and reacted with the reaction product for 2 hours at 180° C.

After the reaction, the softening point and Gardner color number of each modified resin were measured. Then, 40 parts of the modified resin was dissolved in 60 parts of a petroleum solvent (No. 5 Solvent, a product of Nippon Oil Co., ltd.), and the viscosity of the solution was measured on the Gardner scale.

One hundred parts of the modified resin and 66.7 parts of the pertolrum solvent were heated with stirring at 180° C. for 20 minutes to form a dope. A pigment (Phthalocyanine Blue TGR, a product of Dainippon Ink & Chemicals, Inc.) was added to the resulting dope, and the resulting composition was tested for pigment wettability and the strength of a coated film prepared from it. The results are shown in Table 1.

TABLE 1

| Run No. | Control | | Invention | | |
|---|---|---|---|---|---|
| | 1 | 2 | 3 | 4 | 5 |
| Amine | — | n-butyl-amine | Ethylene-diamine | Octyl-enedi-amine | Diethyl-enetri-amine |
| Properties of the resin | | | | | |
| Softening point (°C.) | 110 | 117 | 135 | 140 | 138 |
| Gardner color number | 16 | 17 | 17 | 17 | 17 |
| Viscosity of the solution (Gardner) | S | S | U | U | U |
| Wettability with pigments (*1) | ◎ | ◎ | ◎ | ◎ | ◎ |
| Strength of the coated film (*2) | B | B | A | A | A |

(*1): The pigment was added to the dope, and kneaded on a three-roll mill, and the flowability of the resulting mixture and the state of color formation were observed. The results were evaluated on the following scale.
◎ : good even resulting mixture the pigment content is 30%
⊚ : good when the pigment content is 20%, but poor when it is 30%
X : good when the pigment content is 10%, but poor when it is 20%.
(*2) : Twenty parts of the pigment was added to 80 parts of the dope, and the mixture was kneaded on a three-roll mill. The kneaded mixture was spread on coated paper by an RI tester, and then the coated surface was rubbed through 20 cycles at a load of 2 pounds by a Southerland Rub Tester. The results were evaluated on the following scale.
A : no change is seen on the coated surface
B : slight injury is caused to the coated surface
C : the coated surface is worn away The results obtained show that when the polyamine is reacted (Runs Nos. 3 to 5), the viscosity of a solution of the modified resin rises, and the strength of a coated film from the solution is further improved, but that when the monoamine is reacted as in Run No. 2, there is scarcely any change in viscosity, and no improvement in the strength of the coated film is noted.

EXAMPLE 2

The procedure of Run No. 3 of Example 1 was repeated except that the amount of ethylenediamine was changed to 0.5 mole per mole of maleic anhydride. The resulting modified resin had the following properties.
Softening point: 130° C.
Gardner color number: 17
Viscosity (Gardener) of the solution: T-U
Wettability with pigments: ◎
Strength of the coated film: A

EXAMPLE 3

The procedure of Run No. 3 of Example 1 was repeated except that the amount of ethylenediamine was changed to 1.5 moles per mole of maleic anhydride. The resulting modified resin had the following properties.
Softening point: 138° C.
Gardner color number: 17
Viscosity (Gardner) of the solution: U
Pigment wettability: ◎
Strength of the coated film: A

Referential Example

One hundred parts of the cyclopentadiene resin used in Example 1 was heated and melted at 180° C., and then reacted with 4 parts of maleic anhydride at 180° for 1 hour. The resulting product was then reacted with each of the amines shown in Table 2 in an equimolar amount to maleic anhydride at 180° C. for 2 hours. The products obtained are shown in Table 2.

Then, 45 parts of the resulting product and 20 parts of linseed oil were cooked at 200° C. for 1 hour, and 35 parts of a petroleum-type solvent was added to form a varnish. The pigment wettability of the varnish, and the strength of a coated film prepared from it were measured under the same conditions as in the case of the dope in Example 1. The results are shown in Table 2.

TABLE 2

| Run No. | 1 | 2 | 3 |
|---|---|---|---|
| Amine | — | n-Butyl-amine | Ethylene-diamine |
| Properties of the product | | | |
| Softening point (°C.) | 145 | 148 | 150 |
| Gardner color number | 18 | 19 | 19 |
| Wettability with pigment | X | X | X |
| Strength of the coated film | C | C | C |

A method which comprises forming an addition product of a hydrocarbon resin with an unsaturated dicarboxylic acid anhydride, and imidizing the resulting adduct with a primary amine has been known as a technique of improving pigment wettability (for example, Japanese Patent Publication No. 6823/70, Japanese Laid-Open Patent Publication No. 46209/76, etc.) When this method is employed, both pigment wettability and the strength of the coated film are unsatisfactory as shown in Table 2, and are inferior to those of the control (Run No. 1) shown in Table 1.

What we claim is:
1. A process for producing a modified resin, which comprises reacting
(I) the reaction product of (a) an adduct of a cyclopentadiene resin with an α,β-ethylenically-unsaturated dicarboxylic acid anhydride, with (b) an adduct of a higher fatty acid ester having a conjugated double bond with an α,β-ethylenically-unsaturated dicarboxylic acid anhydride, with
(II) a polyamine having at least two primary or secondary amino groups.

2. The process of claim 1 wherein the modified resin has a softening point of 40° to 180° C.

3. The process of claim 1 wherein proportion of the polyamine (II) is 0.1 to 5 moles per mole of the acid anhydride group in the reaction product (I).

4. The process of claim 3 wherein the reaction between the reaction product (I) and the polyamine (II) is carried out at 50° to 200° C.

5. The process of claim 1 wherein the reaction product (I) is derived from 98 to 35% by weight of the adduct (a) and 2 to 65% by weight of the adduct (b).

6. The process of claim 5 wherein said adduct (a) is derived from 100 parts by weight of a cyclopentadiene resin and 0.1 to 50 parts by weight of the $\alpha,\beta$-ethylenically-unsaturated dicarboxylic acid anhydride.

7. The process of claim 5 wherein said adduct (b) is derived from 100 parts by weight of the higher fatty acid ester and 0.1 to 50 parts by weight of the $\alpha,\beta$-ethylenically-unsaturated dicarboxylic acid anhydride.

8. The process of claim 1 wherein said cyclopentadiene resin has a softening point of 80° to 200° C.

9. The process of claim 1 wherein said higher fatty acid ester is tung oil, dehydrated castor oil, oiticica oil, or perilla oil.

10. A modified resin obtained by the process of any one of claims 1 to 9.

11. A vehicle component composition for printing inks, said composition comprising a modified resin having a softening point of 40° to 180° C., said modified resin being obtained by reacting (I) the reaction product of (a) an adduct between 100 parts by weight of a cyclopentadiene resin and 0.1 to 50 parts by weight of an $\alpha,\beta$-ethylenically-unsaturated dicarboxylic acid anhydride with (b) an adduct between 100 parts by weight of a higher fatty acid ester having a conjugated double bond and 0.1 to 50 parts by weight of an $\alpha,\beta$-ethylenically-unsaturated dicarboxylic acid anhydride, with (II) 0.1 to 5 moles, per mole of the acid anhydride group of said reaction product (I), of a polyamine having at least two primary or secondary amino groups.

12. In an ink comprising a vehicle component, a pigment and a solvent, the improvement wherein said vehicle component is the vehicle component of claim 11.

13. The vehicle component composition for printing inks, according to claim 11, wherein the reaction product (I) is derived from 98 to 35% by weight of the adduct (a) and 2 to 65% by weight of the adduct (b).

14. The vehicle component composition for printing ink, according to claim 13, wherein the cyclopentadiene resin has a softening point of 80°–200° C.; and, wherein, the higher fatty acid ester is tung oil, dehydrated castor oil, ioticica oil, or perilla oil.

15. In an ink comprising a vehicle component, a pigment and a solvent, the improvement comprising the vehicle component of claim 14 as said vehicle component.

* * * * *